Aug. 6, 1957  J. DOTTO  2,801,714
HEAT INSULATING FRICTION SHOE AND PISTON UNIT
Filed June 29, 1956
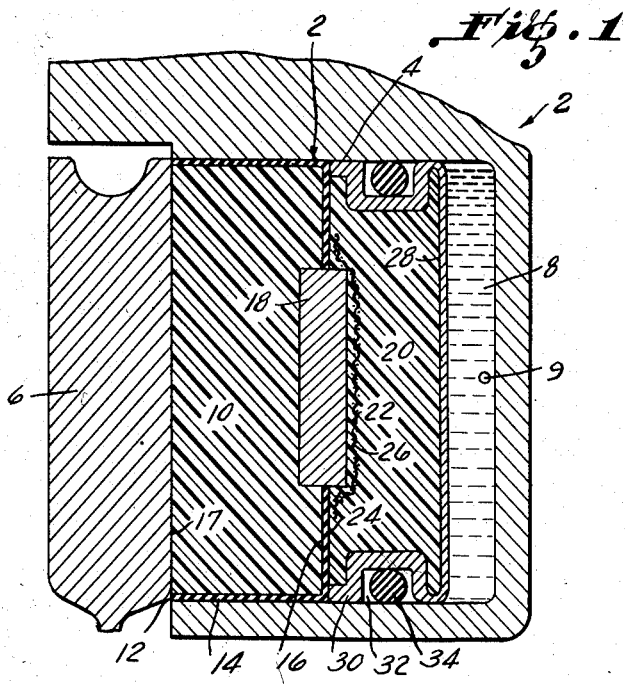
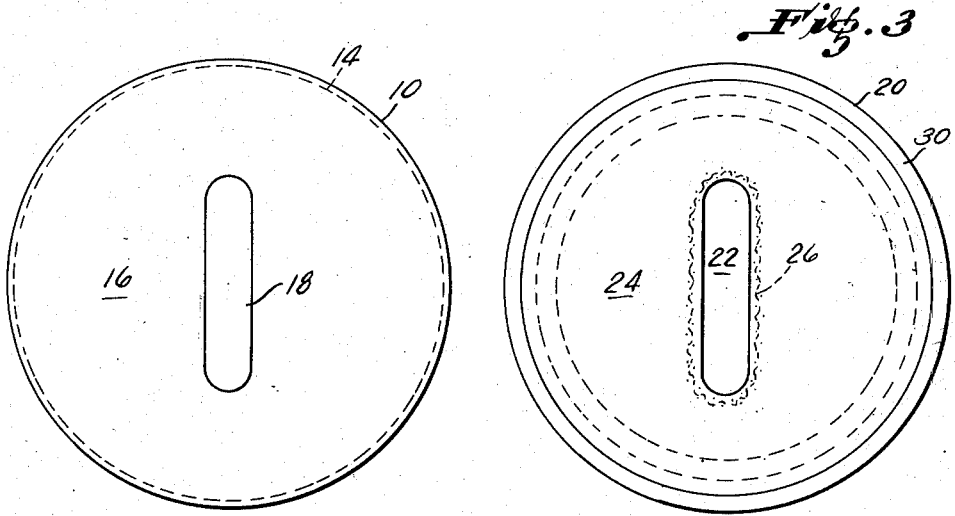
INVENTOR
JOHN DOTTO
BY James H. Littlepage
ATTORNEY

United States Patent Office 2,801,714
Patented Aug. 6, 1957

2,801,714
HEAT INSULATING FRICTION SHOE AND PISTON UNIT

John Dotto, Meadville, Pa., assignor to Meadville Research Products Corporation, Meadville, Pa., a corporation of Pennsylvania Application June 29, 1956, Serial No. 594,982

5 Claims. (Cl. 188—152)

This invention relates to a friction shoe and piston assembly for hydraulically actuated disc brakes and, more particularly, to a heat-insulating construction for deterring the transmission of heat from the working face of the friction shoe to the brake fluid at the rear of the piston.

In a disc brake, wherein a plug-like friction shoe supported in an open-ended cylinder is pressed against the disc by means of a piston, great heat is suddenly generated at the working face of the shoe when the brake is applied. While the composition of the friction shoe is such that the generated heat will not damage it, the brake fluid behind the piston may be heated to the point of vaporization, thereby resulting in complete loss of pedal. Heat generated at the shoe face may pass to the brake fluid in the supporting cylinder either directly back, in the axial direction, through the shoe and piston, or it may pass outwardly through the cylindrical side of the shoe to the metal defining the cylinder and thence directly to the brake fluid and also from the metal cylinder via the piston to the fluid. The object of this invention is to provide a shoe and piston assembly which will not transmit excessive heat to the brake fluid by any path.

These and other objects will be apparent from the following specification and drawing, in which:

Fig. 1 is a cross section centrally through the friction shoe and piston assembly as utilized in a hydraulic disc brake;

Fig. 2 is a plan view of the back face of the friction shoe; and,

Fig. 3 is a plan view of the front face of the piston.

Referring now to the drawing, in which like references numerals denote similar elements, the friction shoe and cylinder unit 2 is adapted to be slidably supported in an open ended cylinder 4 adjacent a disc 6. It will be understood that the cylinder and disc are supported so that one rotates with respect to the other, and that braking occurs when brake fluid 8 in the back end of cylinder 4 is introduced under pressure through an inlet to force the assembly 2 to the left, as shown in Fig. 1, and that a vast amount of frictional heat is created by the braking.

There is provided, according to this invention, a generally cylindrical friction shoe 10 of molded plastic composition characterized by its ability to withstand and operate at heat of about 1900° F. or higher, such material currently being made with asbestos base with small percentages of lead and tin, molded at 10,000 lb. per square inch at 300 degrees Fahrenheit. Comparable material is currently manufactured by several concerns for use as linings for aircraft disc brakes. A thin rubber jacket 12 is molded around and preferably bonded to the cylindrical side wall 14 and the generally flat back face 16 of friction shoe 10. The fundamental characteristics of the rubber forming jacket 12 are that its thermal conductivity is substantially less than that of the molded plastic composition from which the major part of the shoe 10 is molded. The rubber does not melt and flow at the temperatures developed in shoe 10, except at those at the working face 17. A steel key 18 is embedded on the shoe back face 16.

Piston 20 has a body primarily of molded plastic material similar to that from which friction shoe 10 is formed, and is provided with a keyway 20 on its front face 24 press-fitting over key 18. Once engaged, the piston and friction shoe function as a single unit, in that they do not rotate relatively, and they move backwardly and forwardly together. Metal screen re-enforcement 26 is embedded in the material around keyway 22. The plastic material forming piston 20 is molded within a metal shell 30, preferably die cast of aluminum, and having in its periphery an annular groove 32 for accommodating a rubber O ring 34 which provides a seal to prevent leakage of brake fluid 8. The O ring also prevents rotation of unit 2 in cylinder 4 when the brake is applied.

In operation, rubber jacket 12 contains the heat within the molded plastic friction material of shoe 2, and constitutes a barrier to deter heat transmission to piston 20 on the metal defining cylinder 4. While the heat insulating shielding properties of the plastic material constituting the mass of piston 20 are not as great as those of rubber jacket 12, they are nevertheless sufficient to provide further protection for brake fluid 8 and, in practice, vaporization of the brake fluid has been completely eliminated by unit 2. The melting rubber at the edge of working face 17 has not been deleterious, and it is believed that it provides a very slight and beneficial lubrication of the disc face.

The term "rubber" is intended to cover also synthetic materials of rubber-like properties, and it will be apparent to those skilled in the art that various modifications and equivalents may be substituted for the elements detailed herein.

I claim:

1. A combined friction shoe and piston unit of substantially cylindrical configuration comprising a shoe portion formed of molded plastic friction material of predetermined thermal conductivity and having a substantially flat front end wall constituting a working face, a cylindrical side wall, and rear end wall, a comparatively thin rubber jacket surrounding the side and rear end wall of the friction shoe portion, the thermal conductivity of the rubber forming said jacket being substantially less than the conductivity of said molded plastic friction material, a piston portion formed of molded plastic material generally similar to that of which said friction shoe is formed, and means for securing said portions together.

2. The combination claimed in claim 1, the means for securing said portions together comprising a key on one of said portions and a mating keyway on the other portion, and metal mesh re-enforcing material embedded in the molded plastic material forming said other portion and surrounding said keyway.

3. In the combination claimed in claim 1, a metal cup containing said molded plastic piston, said cup having a groove in the outer periphery thereof.

4. A friction shoe and piston unit comprising adjacent cylindrical shoe and piston portions, means forming a heat shield therebetween and means forming a heat shield around said shoe portion.

5. A friction shoe comprising a body having a generally cylindrical side wall, a substantially flat front end wall constituting a working face, and a rear end wall, said body being formed of friction material of predetermined thermal conductivity, and a comparatively thin rubber jacket surrounding said side and rear end walls, the thermal conductivity of said jacket being substantially less than the conductivity of said body.

References Cited in the file of this patent
UNITED STATES PATENTS

| | | |
|---|---|---|
| 2,190,874 | Jarrett | Feb. 20, 1940 |
| 2,437,670 | Adamson | Mar. 16, 1948 |
| 2,720,286 | Bricker | Oct. 11, 1955 |
| 2,784,811 | Butler | Mar. 12, 1957 |
| 2,785,710 | Mowery | Mar. 19, 1957 |